United States Patent
Usgaonkar

(10) Patent No.: US 7,318,138 B1
(45) Date of Patent: Jan. 8, 2008

(54) PREVENTING UNDESIRED TRESPASS IN STORAGE ARRAYS

(75) Inventor: Ameya P. Usgaonkar, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 298 days.

(21) Appl. No.: 11/215,467

(22) Filed: Aug. 30, 2005

(51) Int. Cl.
*G06F 13/00* (2006.01)
(52) U.S. Cl. ...................... 711/163; 711/166
(58) Field of Classification Search ............ 711/163, 711/166
See application file for complete search history.

(56) References Cited

U.S. PATENT DOCUMENTS 6,904,477 B2 * 6/2005 Padmanabhan et al. ....... 710/74
7,194,662 B2 * 3/2007 Do et al. ...................... 714/43
2004/0107300 A1 * 6/2004 Padmanabhan et al. ........ 710/1

* cited by examiner

*Primary Examiner*—Reba I. Elmore
(74) *Attorney, Agent, or Firm*—Campbell Stephenson LLP

(57) ABSTRACT

Procedures and systems for avoiding undesired trespass may be deployed in host processors that use storage arrays with automated fail-back and fail-over functions. In one embodiment, a method may synchronize path records in a storage array with path records in a host processor. The method may detect a failure of a first data path through a first controller on the storage array to a logical unit (LUN) on the storage array. In response to the failure, the host processor may initiate a failover on the storage array of the LUN, so that the LUN is accessed through a backup controller on the storage array. The host processor may also issue commands to pin the failed-over LUN to the backup controller. For example, the host processor may issue commands to set the default owner of the LUN to be the backup controller.

22 Claims, 9 Drawing Sheets

PREVENTING UNDESIRED TRESPASS IN STORAGE ARRAYS

FIELD OF THE INVENTION

The present invention relates to storage devices in distributed computer systems and, more particularly, to coordinating the fail-over and fail-back of logical units in a storage array.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability (HA) situations. Such distributed computing systems typically utilize one or more storage devices in support of the computing systems operations performed by a processing host computer. These storage devices may be quite numerous and/or heterogeneous. In an effort to aggregate such storage devices and to make such storage devices more manageable and flexible, storage virtualization techniques are often used. Storage virtualization techniques establish relationships between physical storage devices, e.g. disk drives, tape drives, optical drives, etc., and virtual or logical storage devices such as volumes, virtual disks, and logical units (sometimes referred to as LUNs). In so doing, virtualization techniques provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restore.

FIG. 1 illustrates a simplified example of a computing system 100. The members of the computing system 100 include a host processor ("host") 130. Thus, host 130 is typically an individual computer system having some or all of the software and hardware components well known to those having skill in the art. In support of various applications and operations, host 130 may exchange data over, for example, a network 120, typically a local area network (LAN) such as an enterprise-wide intranet, or a wide area network (WAN) such as the Internet. Additionally, network 120 provides a communication path for various client computer systems 110 to communicate with host 130. In addition to network 120, host 130 may communicate with other computing hosts over a private network (not shown).

Other elements of computing system 100 may include a storage area network (SAN) 150 and storage devices such as a tape library 160 (typically including one or more tape drives), a group of disk drives 170 (i.e., "just a bunch of disks" or "JBOD"), and an intelligent storage array 180. As shown in FIG. 1, host 130 is coupled to SAN 150. SAN 150 is conventionally a high-speed network that allows the establishment of direct connections among storage devices 160, 170, and 180 and host 130. SAN 150 may also include one or more SAN-specific devices such as SAN switches, SAN routers, SAN hubs, or some type of storage appliance. SAN 150 may also be coupled to additional hosts. Thus, SAN 150 may be shared between the hosts may and allow for the sharing of storage devices between the hosts to provide greater availability and reliability of storage. Although host 130 is shown connected to storage devices 160, 170, and 180 through SAN 150, this need not be the case. Shared resources may be directly connected to some or all of the hosts in the computing system, and computing system 100 need not include a SAN. Alternatively, or in addition, host 130 may be connected to multiple SANs.

FIG. 2 illustrates in greater detail several components of computing system 100. For example, storage array 180 is illustrated as a disk array with two input/output (I/O) ports 181 and 186. Associated with each I/O port is a respective storage controller (182 and 187), and each storage controller generally manages I/O operations to and from the storage array through the associated I/O port. In this example, storage controller 182 includes a processor 183, a memory cache 184 and a regular memory 185. Processor 183 is coupled to cache 184 and to memory 185. Similarly, storage controller 187 may include a processor 188, a memory cache 189 and a regular memory 190. Processor 188 is coupled to cache 189 and to memory 190.

Although one or more of each of these components is typical in storage arrays, other variations and combinations are well known in the art. The storage array may also include some number of disk drives (logical units (LUNs) 191-195) accessible by both storage controllers. As illustrated, each disk drive is shown as a LUN, which is generally an indivisible unit presented by a storage device to its host(s). Logical unit numbers, also sometimes referred to as LUNs, are typically assigned to each disk drive in a storage array so the host may address and access the data on those devices. In some implementations, a LUN may include multiple physical devices, e.g., several disk drives, that are logically presented as a single device. Similarly, in various implementations a LUN may consist of a portion of a physical device, such as a logical section of a single disk drive.

FIG. 2 also illustrates some of the software and hardware components present in host 130. Host 130 may execute one or more application programs 131. Such applications may include, but are not limited to, database administration systems (DBMS), file servers, application servers, web servers, backup and restore software, customer relationship management software, and the like. The applications and other software not shown, e.g., operating systems, file systems, and applications executing on client computer systems 110 may initiate or request I/O operations against storage devices such as storage array 180. Host 130 may also executes a volume manager 133 that enables physical resources configured in the computing system to be managed as logical devices. An example of software that performs some or all of the functions of a volume manager 133 is the VERITAS Volume Manager™ product provided by VERITAS Software Corporation. Host 130 may take advantage of the fact that storage array 180 has more than one I/O port by using a dynamic multipathing (DMP) driver 135 as well as multiple host bus adaptors (HBAs) 137 and 139. The HBAs may provide a hardware interface between the host bus and the storage network, typically implemented as a Fibre Channel network. Host 130 may have multiple HBAs to provide redundancy and/or to take better advantage of storage devices having multiple ports.

The DMP functionality may enable greater reliability and performance by using path fail-over and load balancing. In general, the multipathing policy used by DMP driver 135 depends on the characteristics of the storage array in use.

Active/active storage arrays (A/A arrays) permit several paths to be used concurrently for I/O operations. For example, if storage array 180 is implemented as an A/A array, then host 130 may be able to access data through one path that goes through I/O port 181 and through a separate second path that goes through port 186. Such arrays enable DMP driver 135 to provide greater I/O throughput by dividing the I/O load across the multiple paths to the disk devices. In the event of a loss of one connection to a storage array, the DMP driver may automatically route I/O operations over the other available connection(s) to the storage array.

Active/passive arrays with so-called auto-trespass mode (A/P arrays) allow I/O operations on one or more primary paths while one or more secondary path is available in case the primary path fails. For example, if storage array 180 is implemented as an A/P array, then the storage array 180 may designate a primary path and a secondary path for each of the LUNs in the storage array. Storage array 180 may designate controller 182 as the primary controller for LUNs 191, 192, and 193. Communication between these LUNs and host 130 would then be directed though controller 182, I/O port 181, SAN 150, and one or both of HBAs 137 and 139. These elements would together form a primary path for LUNs 191, 192, and 193. A secondary path would be designated as a redundant backup path. The secondary path would include the other controller 187, I/O port 186, SAN 150, and one or both of HBAs 137 and 139.

While controller 182 and the associated elements may be designated as the primary path for some of the LUNs, controller 186 and the associated elements may be designated as the primary controller for other LUNs. For example, LUNs 191, 192, and 193 may have a primary path that includes controller 182 and a secondary path that includes controller 187. At the same time, LUNs 194 and 195 may have a primary path that includes controller 187 and a secondary path that includes controller 182.

In an A/P array, controllers 182 and 187 may take steps to restrict host 130 from using both paths to communicate with any single LUN. Instead, to communicate with a LUN the host normally uses only one of the available paths. This path may be called the active path; the remaining path may be called the passive path. This arrangement allows the controllers 182 and 187 to more readily manage data traffic and caching for their respective LUNs. When a host communicates with a LUN over a path that is not the path designated for use with that LUN, the communication is considered a trespass on that path.

In the event that the primary path for a LUN fails, a host will need to turn to that LUN's secondary path until external measures have successfully corrected the problem with the primary path. Initially, the primary path for a LUN is designated as the path to be used for communication with that LUN. After a host detects that a primary path for a LUN has failed, the host may switch paths and attempt to communicate with the LUN on its secondary path. The storage array would then detect that communication as a trespass on the secondary path. In an active/passive array with auto-trespass mode, the storage array interprets this trespass as an indication that a primary path has failed. The A/P array may then respond by switching controllers for that LUN, so that the secondary path is designated as the path to be used for communication with that LUN. The host can then communicate with the LUN over the secondary path until the primary path is restored.

This process of the host and the storage array switching paths in response to failure of the primary path may be known as a fail-over. Similarly, the process of the host and the storage array switching back to the primary path after the restoration of the primary path may be known as a fail-back.

In active/passive arrays with auto-trespass mode, the controllers may be configured to automatically perform a fail-back when a trespass is detected on a primary path—that is, when the secondary path has been designated as the path to be used, but I/O is received on the primary path. The A/P array may interpret this situation as meaning that the primary path has been restored. In response, the A/P array may designate the primary path once again as the path to be used.

Active/passive arrays may alternatively be configured without an automated response to trespasses. For example, active/passive arrays in explicit fail-over mode (A/PF arrays) do not have these automated responses. A/PF arrays typically require a special command to be issued to the storage array for fail-over to occur. The special command may be a SCSI command or a Fibre Channel command, and may be tailored for the type of storage array being addressed.

Active/passive arrays with LUN group fail-over (A/PG arrays) treat a group of LUNs that are connected through a controller as a single fail-over entity. Fail-over occurs at the controller level and not at the LUN level (as would typically be the case for an A/P array in auto-trespass mode). The primary and secondary controllers are each connected to a separate group of LUNs. If a single LUN in the primary controller's LUN group fails, all LUNs in that group fail over to the secondary controller's LUN group.

Yet another type of storage array employs Asymmetric Logical Unit Access (ALUA). ALUA arrays may include two controllers and may allow I/O through both the controllers, similar to the arrangement in A/A arrays, but the secondary controller may provide a lower throughput than the primary controller. For example, if storage array 180 is implemented as an ALUA array, then the storage array 180 may designate a primary path and a secondary path for each of the LUNs in the storage array. Storage array 180 may designate controller 182 as the primary controller for LUNs 191, 192, and 193, and may designate controller 187 as the primary controller for LUNs 194 and 195. Controller 182 may then serve as a redundant secondary controller for LUNs 194 and 195, and controller 187 may then serve as a redundant secondary controller for LUNs 191, 192, and 193.

ALUA arrays may generally support fail-over and fail-back in response to a failure and a restoration of a primary path. The fail-over and fail-back in ALUA arrays may be SCSI command based, as described above for A/PF arrays. Alternatively, the fail-over and fail-back may be I/O based, such as described above for A/P arrays. In various types of ALUA arrays, the fail-over is generally at the LUN level. Each LUN undergoes fail-over only when a trespass is detected on the secondary path for that LUN. This approach may avoid unnecessary fail-overs in situations where a primary path experiences only a temporary failure.

Fail-backs, however, are generally performed at a group level in ALUA arrays. ALUA arrays define groups for the LUNs within the storage array. Fail-backs may be performed for an entire group of LUNs when a trespass is detected on the primary path for any of the LUNs in the group, since fail-backs generally improve the performance of a LUN. Thus, if storage array 180 is implemented as an ALUA array, then when storage array 180 performs a fail-back for LUN 192, the storage array may also perform a fail-back for other LUNs (e.g., LUNs 191 and 193) in the same group.

To coordinate the fail-back of LUNs in a group, an ALUA array may maintain two records for each LUN. One of the records may designate the default path to be used for access to the LUN. A second record may be used to designate the current path to be used for the LUN. Initially, the ALUA array may decide which of the available paths should be used as the default path for a group of LUNs. The ALUA array may then set the current path for those LUNs to be the same as the default paths. When a fail-over occurs for one of the LUNs, the ALUA array may change the current path to be the backup path for that LUN. Meanwhile, the record of the default path indicates which path should be monitored so that a fail-back can be performed once the default path has been restored.

Various aspects of ALUA arrays may lead to drawbacks in the operating environment. For example, an ALUA array may be configured to wait before performing a fail-over for idle LUNs. Thus, there may be some delay before an ALUA array performs the fail-over for idle LUNs that are assigned to a failed path. This delay may help the storage array to avoid unnecessary fail-overs in situations where a primary path experiences only a temporary failure. However, the delay in failing over idle LUNs and the group-fail-back approach may lead to inconsistencies between the records of the ALUA array and the records of the host.

Because of this delay, it is possible for the records of an ALUA array to indicate that one path is the current path for a LUN, while the records of a host may indicate that another path is the path to be used for that LUN. In various implementations of ALUA arrays, the amount of delay may not be readily ascertained by host processors using the ALUA array. Thus, when a host initiates communication with a formerly idle LUN, the host may not be able to ensure that the host uses the same path as designated by the ALUA array for that LUN.

The inconsistencies between the records in the storage array and the records in the host may have undesirable consequences. For example, a host may trigger an undesired fail-over or a fail-back by unintentionally communicating with a LUN on a path that is not considered current by the storage array. It would therefore be helpful to have tools for reducing or preventing mismatches in the records of LUN assignments between host processors and storage arrays.

SUMMARY OF THE INVENTION

Described herein are various procedures and systems that may be used to avoid undesired trespasses in storage arrays with automated fail-back tools. In one embodiment of a method for avoiding undesired trespasses, a host processor may synchronize path records in a storage array with path records in the host processor. The host processor may initially communicate with one or more logical units (LUNs) on the storage array through a first data path that uses a first controller on the storage array. If a failure occurs in the first data path, the host processor may switch to communicating with the LUN through a backup path that uses a backup controller on the storage array. The host processor may also issue commands to pin the storage array to using the backup controller for the LUN. The pinning may ensure that the storage array does not automatically perform a fail-back for that LUN until permitted by the host processor.

In order to pin the storage array to using the backup controller for the LUN, one implementation of the host processor may issue commands to set the default owner of the LUN to be the backup controller. Such commands (or others) may lock a record in the storage array so that the storage array designates the backup controller as the preferred controller for communication with the LUN. The locking may prevent the storage array from re-designating the first controller for communication with the LUN.

Various storage arrays may perform automated fail-overs of LUNs in response to trespasses on secondary paths for the LUNs. Such storage arrays may also perform automated fail-backs in response to trespasses on (recovered) primary paths. The automated fail-backs may be performed on a group basis for the LUNs. In one implementation, the method includes measures to prevent group-based fail-backs of LUNs that were idle during an initial fail-over.

In one implementation, a system includes a memory, a dynamic multipath module, and a path monitor module. The system may be implemented as a host processor or as a component or components thereof. The memory may be used to hold ownership records that designate a controller on a storage array. A first data path may be used for communication with the LUN, with the first data path including the controller designated in the memory. The dynamic multipath module may be configured to communicate with the LUN through the controller designated in the memory. The path monitor module may be configured to detect a failure of the first data path.

In response to a failure of the first data path, the dynamic multipath module may be configured to update the ownership records in the memory to designate an alternate controller on the storage array. The dynamic multipath module may also be configured to update a record in the storage array to designate the alternate controller as a default owner for the LUN. These acts may provide synchronization between records in the system memory and records in the storage array. The system may then communicate with the LUN through an alternate path that includes the alternate controller.

After detecting the failure of the primary path, the system may need to initiate communication with one or more formerly idle LUN. To facilitate communications with idle LUNs, the dynamic multipath module may further be configured to initially leave unchanged ownership records in the memory that pertain to the idle LUNs. If communication is subsequently required with the idle LUNs, the dynamic multipath module may be configured to attempt to communicate with the idle LUNs through the first data path. If this attempt fails, the dynamic multipath module may be configured to update the ownership records in the memory that pertain to the idle LUNs, so that these records also designate the alternate controller. The dynamic multipath module may further be configured to update records in the storage array to designate the alternate controller as the default owner for the idle LUNs. The system may then communicate with the idle LUNs through the alternate path.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
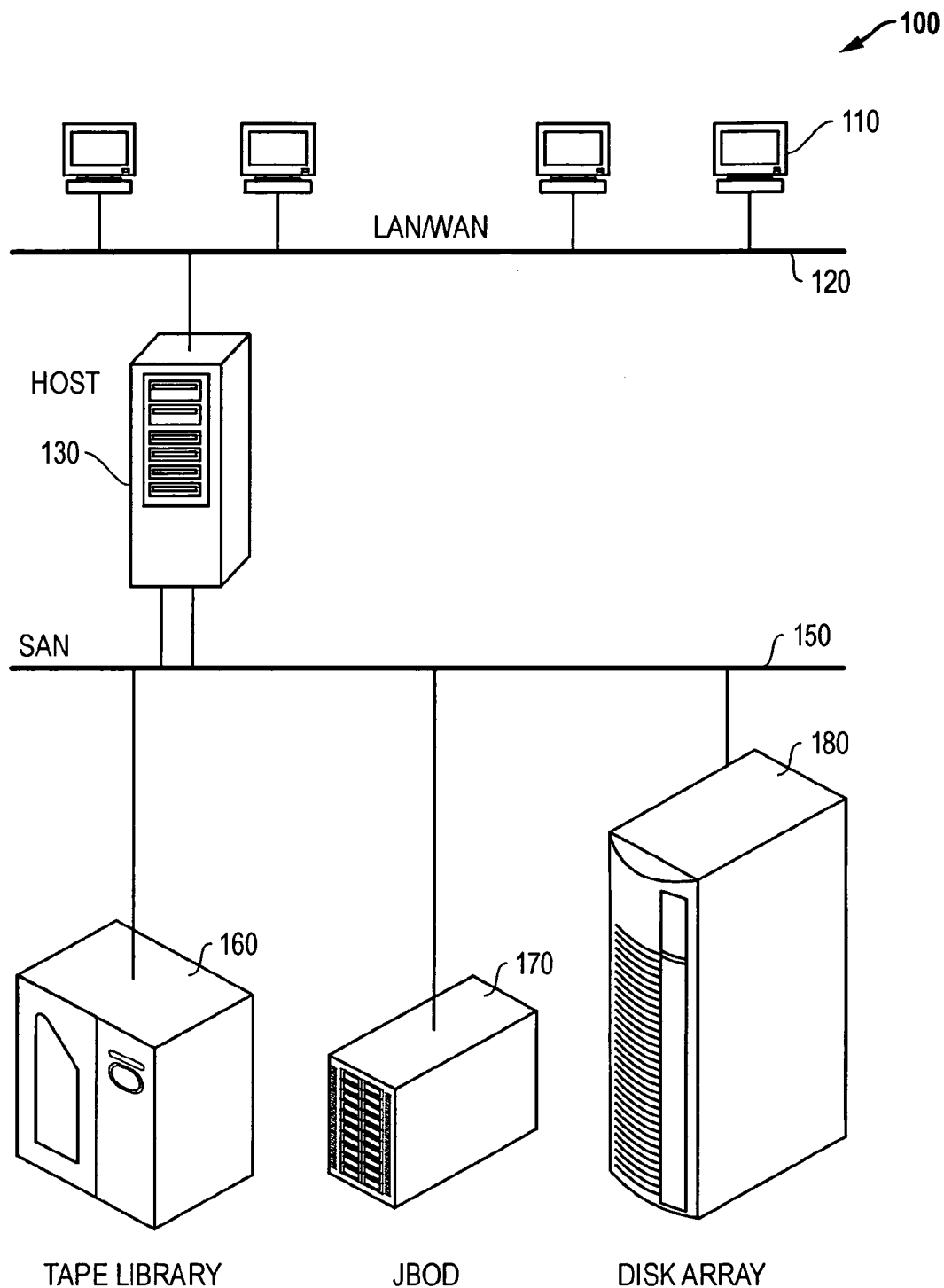
FIG. 1 is a simplified block diagram of a computing system.
Figure 2:
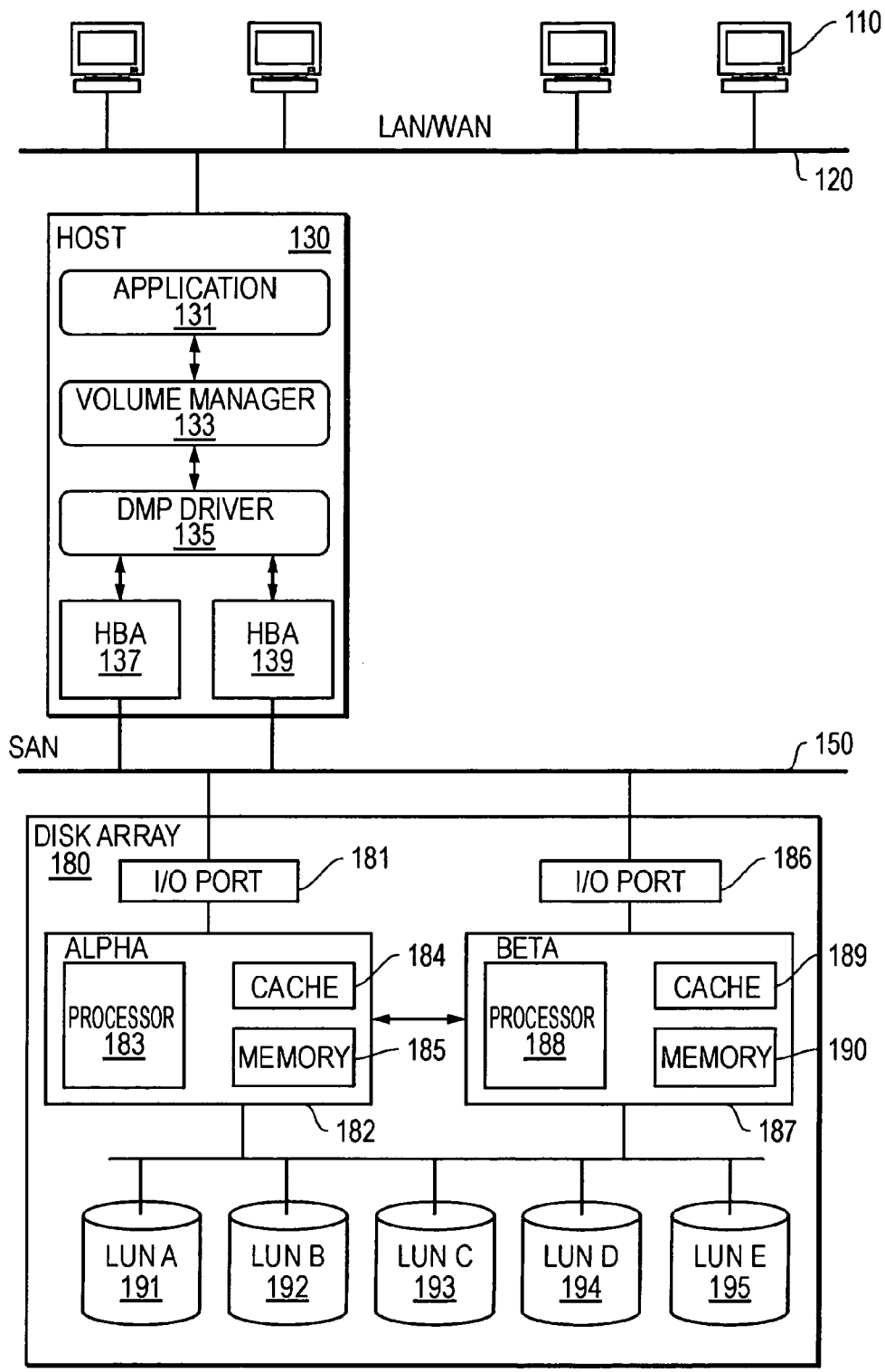
FIG. 2 is a simplified block diagram illustrating in greater detail several components of the computing system shown in FIG. 1.
Figure 3:
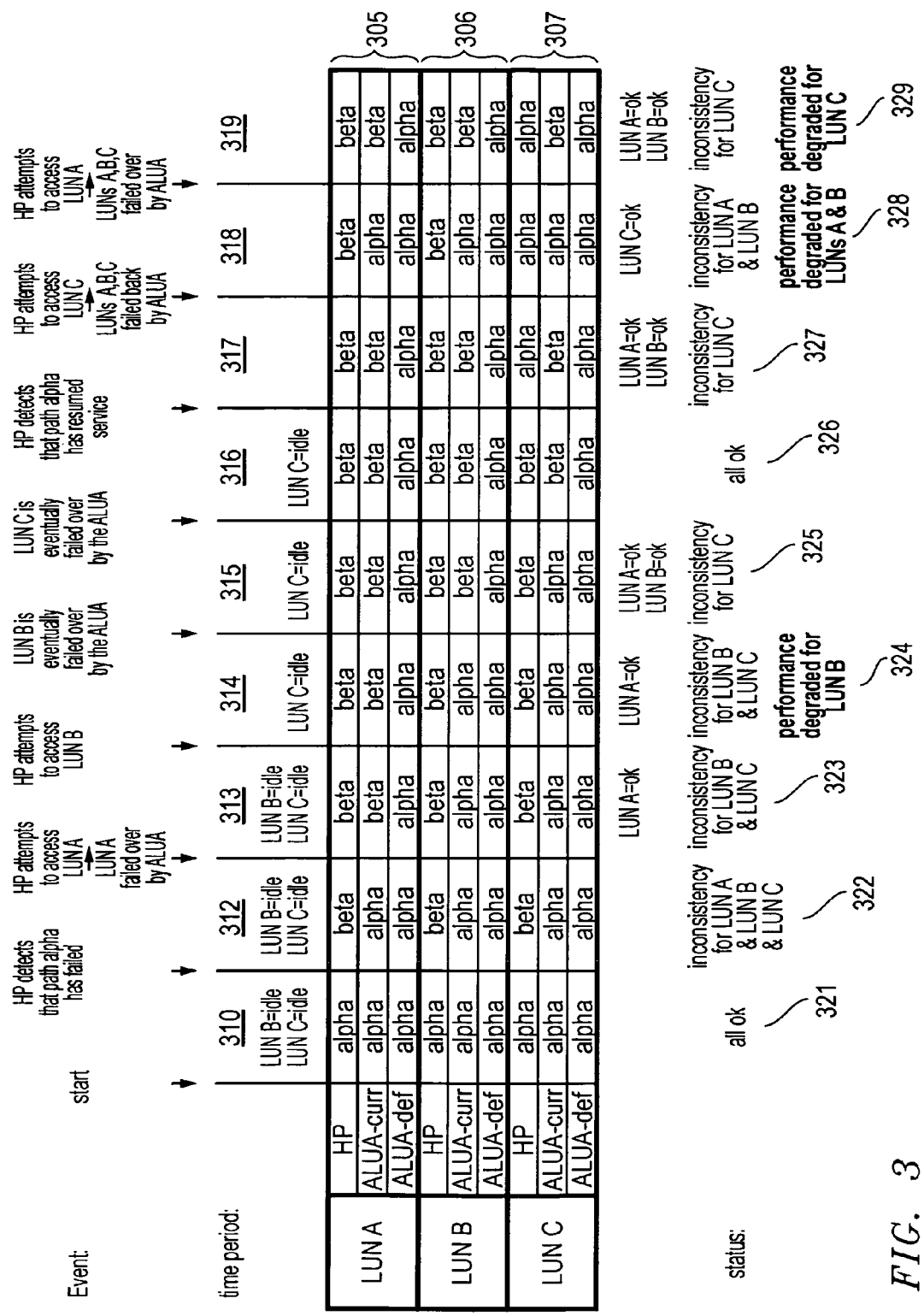
FIG. 3 is a timing diagram illustrating an example of a mismatch in path assignments in a host processor and in a storage array.

FIG. 3 is a timing diagram illustrating an example of a mismatch in path assignments in a host processor and in a storage array. It has been found that certain situations may produce degraded performance in systems employing various forms of ALUA arrays. An appropriate analysis may reveal some deficiencies in such systems, and may be used to determine appropriate solutions for the systems. FIG. 3 illustrates an analysis of performance of an ALUA array that holds several LUNs being used by a host processor such as the host 130. The ALUA array may include various LUNs, such as LUNs 191-195 from FIG. 2. The LUNs may be coupled through two or more controllers, such as controllers 182 and 187, and two or more I/O ports, such as I/O port 181 and 186, to the host processor.

In the example of this timing diagram, the ALUA array has made various groupings of the LUNs in the ALUA array. One of the groups has three of the LUNs, indicated in the timing diagram as LUN A, LUN B, and LUN C. These three LUNs may be, for example, LUNs 191, 192, and 193, respectively from FIG. 2. The timing diagram includes three rows 305, 306, and 307 for the three LUNs A, B, and C, respectively. The timing diagram includes nine columns 311-319 for nine sequential time periods depicted in the figure. Below each column is a status 321-329 describing the system for the corresponding time period.

The timing diagram of FIG. 3 includes three entries for each LUN at each time period. These three entries indicate which one of two paths, designated as "alpha" and "beta," has been designated for use in communicating with a particular LUN at a particular time. The alpha and beta paths may be, for example, the data paths that use controllers 182 and 187, respectively from FIG. 2. One of the three entries shows (a) whether the host processor ("HP") designates path alpha or path beta for access to the LUN. The remaining two entries show (b) whether the ALUA array designates path alpha or path beta for current access to the LUN ("ALUA-curr"), and (c) whether the ALUA array designates path alpha or path beta for default access to the LUN ("ALUA-def").

An equivalent terminology describes the ALUA array records as indicating (b) which controller is the "default owner" of a LUN and (c) which controller is the "current owner" of a LUN. The default owner controller is the controller designated by the ALUA array as the desired controller for a LUN, whereas the current owner controller is the controller to which the LUN is bound at a particular time. The default owner may be changed at any time, but is usually static information. The default owner denotes the group membership identifier for the LUN. The current owner controller is the controller designated by the ALUA array as the current controller to be used for communication with a LUN. When a LUN fails over, its current owner changes to the controller to which it has failed over.

For example, the intersection of row 306 and column 314 is a block with three entries. These three entries indicate which path has been designated for access to LUN B (row 306) during the fourth time period in the example (column 314). The three entries show that in this example, path beta is designated by the host processor for access to LUN B, path alpha is designated by the ALUA array for current access to LUN B, and path alpha is designated by the ALUA array default access to LUN B during this time period.

The timing diagram of FIG. 3 begins with column 311, in which all records indicate path alpha as the path to be used for communication with LUNs A, B, and C. This initial condition may generally be reached in two steps. First, the ALUA array may define the LUN groups based on various criteria, such as an initial attempt to roughly balance the data traffic on the various data paths. The ALUA array may then assign each LUN to be a member of one of the groups, with each LUN from a group being designated to use a particular data path as the primary path. A host processor may learn of these assignments by querying the ALUA array using appropriate interface commands.

In the example shown in column 311, the ALUA array has designated LUNs A, B, and C to be in one group, and has designated path alpha as the primary path for the LUNs in this group. Thus, the ALUA array's records show that the default path for each LUN in this group is path alpha, and the current path for these LUNs has been initially set also to be path alpha. The host processor has learned of these assignments by querying the ALUA array, and has set its records to show that path alpha is the path to be used for all three LUNs in the group.

The host processor may then communicate with the various LUNs through path alpha. In this example, path alpha is initially (in the time period of column 311) being actively used for communication with LUN A. LUNs B and C are initially idle. While path alpha is assigned to these two LUNs, the host processor is not yet attempting to communicate with them in the time period of column 311. As indicated by status 321, this situation is an acceptable initial condition for the ALUA array and the host processor.

In the course of communicating with LUN A, the host processor may detect that path alpha has failed. The multipathing software on the host processor (such as DMP driver 135 from FIG. 2) may respond by switching to using path beta for subsequent I/O operations to LUNs that were assigned to the failed path.

This situation is illustrated in column 312, which indicates the situation resulting after path alpha fails and the host processor detects the failure. In this brief time period, the host processor may designate path beta for use with all three LUNs A, B, and C, since all three LUNs were previously assigned to the now-failed path alpha. In this time period 312, the ALUA array has not yet learned of the failure of path alpha, and continues to indicate that path alpha is to be used for LUNs A, B, and C. As indicated by status 322, the host processor and the ALUA array have different records in time period 312 regarding with path should be used for communications with LUNs A, B, and C. These inconsistencies, however, do not substantially affect system performance, since no communication is occurring with LUNs A, B, and C during time period 312.

When the host processor then communicates with LUN A on path beta, this communication is seen by the ALUA array as a trespass on path beta. The ALUA array may then fail over LUN A to path beta in response to the resulting trespass. The result is illustrated in column 313. In this time period, the records are the same as from column 312, with one change: the ALUA array has designated path beta as the current path for use with LUN A. In this example, the ALUA array continues to designate path alpha as the current path for LUNs B and C, since they are idle. As indicated by status 323, the host processor and the ALUA array have consistent records in time period 313 for LUN A, but have different records for LUNs B and C. These inconsistencies, however, do not substantially affect system performance, since no communication is occurring with idle LUNs B and C.

The ALUA's designation of the default path for LUN B remains unchanged in column 313. The ALUA array continues to designate path alpha as the default path for LUN A, since the default path indicates which path should be monitored so that a fail-back can be executed when that path is restored. As can be seen from the remainder of the columns in FIG. 3, the ALUA array does not change any of the entries for the default paths. These entries are maintained as path alpha, indicating that if path alpha should be restored, the LUNs should be failed back to path alpha.

In addition to LUN A, the ALUA array may also fail over additional LUNs in the same group, one at a time, when the ALUA array detects trespasses for each of those LUNs. Although the ALUA array may be configured to perform fail-overs on a LUN-by-LUN basis, the ALUA array may typically be configured to perform fail-backs on a group basis. Thus, when a fail-back occurs for one of the LUNs in the group, the ALUA array immediately fails back all of the LUNs in the group.

Idle LUNs may be treated somewhat differently by an ALUA. There may be some delay before an ALUA array performs the fail-over for idle LUNs that are assigned to the failed path. Eventually, the ALUA array performs the fail-over for idle LUNs assigned to the failed path. This fail-over is carried out internally in the ALUA array, without any automatic informing of the host processor. Thus, the ALUA array may associate an idle LUN with the controller for the LUN's secondary path, while a host processor continues to associate that LUN with its primary path. These behaviors are illustrated in the subsequent columns 314-318.

In the example scenario shown in FIG. 3, the host processor initiates communication with LUN B between time periods 313 and 314. In column 314, no change occurs in the records for LUNs A and C. Regarding LUN B, the host processor now communicates with LUN B over path beta. To the detriment of the system, however, the ALUA array may delay before responding with a change in the assignment of LUN B. The ALUA array may continue to deem LUN B as an idle LUN for some time. As an idle LUN, LUN B is not immediately failed over by the ALUA array, and the ALUA array continues to designate path alpha as the current path for LUN B. Thus, both path alpha and path beta are concurrently designated for LUN B in column 314. The host processor considers path beta as the path to be used for LUN B, and the ALUA array considers path alpha as the current path for LUN B. This mismatch between the designations in the host processor and in the ALUA array may severely degrade the performance of the ALUA array.

The degraded performance may arise through a variety of effects. Unlike A/A arrays, ALUA arrays may not be configured for a single LUN to use both a primary path and a secondary path concurrently. As can be seen with reference to FIG. 2, if the ALUA designates path alpha as the primary path for LUN B (as illustrated in column 314), then the ALUA array may direct traffic for LUN B through controller 182. Data for this communication may be buffered in cache 184, and memory 185 may be used to store indexing data, confirmation data, and other information in support of the communication. The contents of cache 184 and memory 185 are readily available to the controller's processor 183 to smoothly manage the communication.

However, the contents of cache 184 and memory 185 are not readily available to processor 188, which is in controller 187. Controller 187 is in path beta, which must be used while path alpha has failed. If data is communicated with LUN B through path beta, then that communication is normally managed by processor 188. To support the communication, the ALUA may need to copy or transfer information between caches 184 and 189, and between memories 185 and 190 so that the communication may be managed by processor 188, which serves path beta—the non-failed path.

This copying may substantially impair the operation of the ALUA. This impairment may generally persist even after path alpha has been restored, because the mismatch in records may continue to force both controller 182 and controller 187 to be used concurrently for communication with LUN B.

Thus, inconsistencies between the records in the ALUA array and the records in the host processor may have undesirable consequences. As shown in status 324, the performance of the ALUA array is degraded for LUN B during the time period of column 314.

Eventually, the ALUA array may perform the fail-over for LUN B. The resulting situation is illustrated in column 315. This column has the same entries as column 314, except that the ALUA array now designates path beta as the current path to be used for LUN B. Status 325 shows that an inconsistency remains for LUN C, but does not substantially impair performance since LUN C is idle.

The ALUA array may also eventually perform the fail-over for LUN C. The resulting situation is illustrated in column 316. This column has the same entries as column 315, except that the ALUA array now designates path beta as the current path to be used for LUN C. Status 326 shows that no inconsistencies remain between the assignments in the ALUA array and the host processor.

Problems may return, however, during a fail-back. In the depicted scenario of FIG. 3, the host processor detects that path alpha has been restored. This restoration may take place because of some manual repair by a system operator, or through some automated response by a network system, or through some other corrective measure in path alpha. Thus, path alpha and path beta are both available for communication with the LUNs in the time periods for columns 317-319.

Column 317 illustrates the situation after the host processor discovers the restoration of path alpha. The host processor may not immediately fail back its designations for all of the LUNs. For example, since communication is occurring successfully with LUNs A and B, the host processor may wait before switching back to path alpha for these LUNs. Thus, the status for LUNs A and B is the same in column 317 as in column 316. However, the host processor may immediately switch its designated path for idle LUN C back to the originally designated path alpha. Column 317 therefore shows that while the ALUA array continues to designate path beta as the current path for LUN C, the host processor designates path alpha for LUN C. This inconsistency is indicated in status 327, but may not pose a significant problem since LUN C is idle.

If the host processor then initiates communication with LUN C, the host processor will attempt to reach LUN C through path alpha. The ALUA array, however, may expect communication on the path beta, since path beta is designated as the current path (as shown in row 307, column 317). The ALUA array may detect this communication as a trespass on path alpha, since path alpha is not the current path for LUN C. Further, since path alpha is the default path for LUN C, the ALUA array may respond by performing a fail-back for LUN C. This fail-back will again designate path alpha as the current path for LUN C.

The result of the fail-back is shown in column 318. The ALUA array has designated path alpha as the current path for LUN C. This fail-back may be performed immediately in response to the trespass on path alpha, since the ALUA array may be configured to respond rapidly to the restoration of a path. The ALUA may also immediately perform fail-backs of LUNs A and B, since ALUA arrays may generally be configured to perform fail-backs on a group basis. Thus, the ALUA array may designate path alpha as the current path for LUNs A, B, and C, as shown in column 318. As shown in status 328, the resulting records for LUN C are consistent, but the group fail-back introduces inconsistencies for LUNs A and B. These inconsistencies may substantially degrade performance of the ALUA array for LUNs A and B, as indicated in status 328.

The inconsistencies for LUNs A and B in the example of column 318 arise because the host processor is unaware of this fail-back performed in the ALUA array for LUNs A and B. In addition to degrading performance during the time period 328, these inconsistencies may lead to further undesired trespasses. If the host processor attempts to communicate with LUN A, it will do so over path beta, as indicated in column 318, row 305. Because of the inconsistencies in column 318, this communication will trigger a fail-over of LUN A in the ALUA array. Depending on conditions, the ALUA array may eventually also fail over LUNs B and C. The resulting situation is shown in column 319, where the ALUA array indicates that path beta is the current path to be used for LUNs A, B, and C. The status 329 shows that performance is then degraded for LUN C (at least until the ALUA array eventually responds by failing over LUN C).

If the host processor subsequently communicates with LUN C, the ALUA array may eventually respond by failing over LUN C. In that case, the system returns to the situation shown in column 318. Depending on events, the system may alternate repeatedly between the situations shown in columns 318 and 319. This alternating loop may be described as an undesired "ping-pong" effect, where unintended fail-overs and fail-backs occur in the absence of a failed data path.

Such an undesired effect may continue until external procedures, such as a manual or automated review of the system status, resets the records in the host processor and the ALUA array to use the restored path alpha for all three of the grouped LUNs A, B, and C. Further, issues with undesirable fail-overs and fail-backs may be compounded in systems where two or more hosts access LUNs on a storage array.

Figure 9:
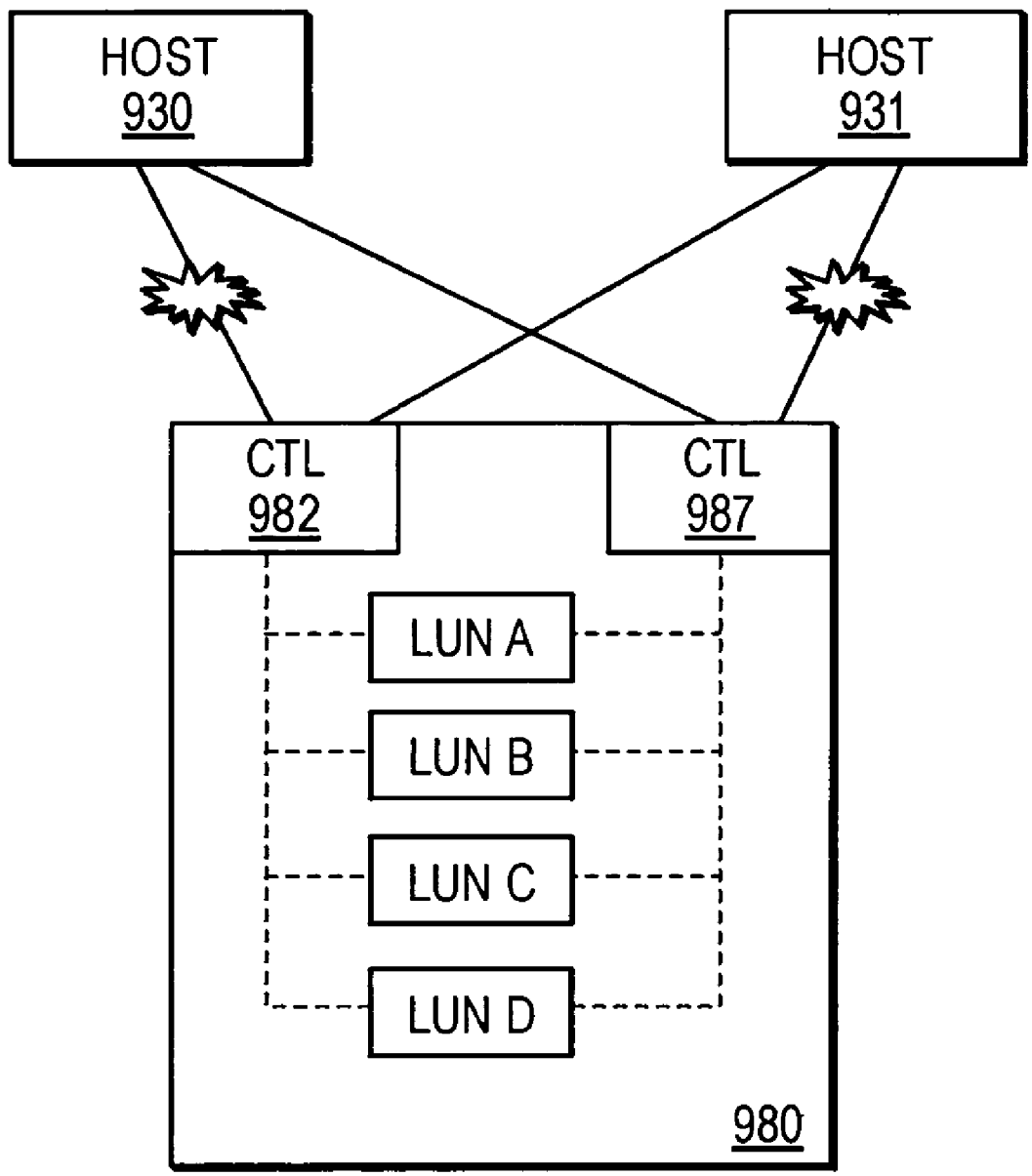
FIG. 9 is a block diagram of a system with two host processors sharing access to a storage array.

FIG. 9 is a block diagram illustrating a situation where two host processors, host 930 and host 931, are in a cluster and share access to an ALUA array 980. The ALUA array 930 may include two controllers 988 and 987 and several LUNs A-D. Each of the LUNs may be used by one of the hosts. For example, host 930 may use LUN A and host 931 may use LUN B. The two hosts are each coupled to two controllers 982 and 987 on the ALUA array. Thus a total of four connections may be used to link the hosts and the ALUA array: one link from each of host 930 and host 931 to each of controllers 982 and 987 on the ALUA array.

The hosts and the ALUA array may initially assign each of the LUNs to one of the controllers. In this example, LUNs A and B are designated to use primary paths through controller 982, with redundant secondary paths being available through controller 987. Consider a situation where two of the four links fail as illustrated in the diagram: host 930 loses contact with controller 982 but retains contact with controller 987, and host 931 loses contact with controller 987 but retains contact with controller 982. In this situation, host 930 will need to fail over to use controller 987, while no fail-over will be needed for host 931. Ultimately, since only two of the four original links are operational, hosts 930 and 931 must use what is available: host 930 can only communicate with the ALUA through controller 987, and host 931 can only communicate with the ALUA through controller 982.

The ALUA array may behave inappropriately in this situation. The ALUA array may alternately (a) interpret communications from host 930 as meaning that paths through controller 982 have failed, and (b) interpret communications from host 931 as meaning that paths through controller 982 have been restored.

The following scenario indicates such a result. First, host 930 may attempt to communicate with LUN A. Since the primary path has failed for this communication, host 930 will to communicate with LUN A through controller 987, thereby causing a trespass to be seen by the ALUA array 980. Second, because of the LUN grouping, the ALUA array 980 may eventually fail over both LUN A and LUN B to use controller 987. Third, host 931 may attempt to communicate with LUN B. This communication will successfully occur through the controller 982, and will cause the ALUA array to perform a fail-back for both LUN A and LUN B. Fourth, host 930 may attempt to communicate with LUN A, which may again trigger a fail-over in the ALUA array. If this I/O pattern continues, the designated controllers for LUNs A and B will keep changing in the ALUA array.

In view of undesirable effects such as may occur in multi-host systems, such as those illustrated in FIG. 9, and in single-host systems, such as those illustrated in FIG. 3, it would be helpful to use techniques for avoiding mismatches between path assignments in a host processor and in an ALUA array. Such techniques may diminish or prevent unnecessary fail-overs and fail-backs caused by unintended trespasses on storage arrays with auto-trespass features.

Figure 4:
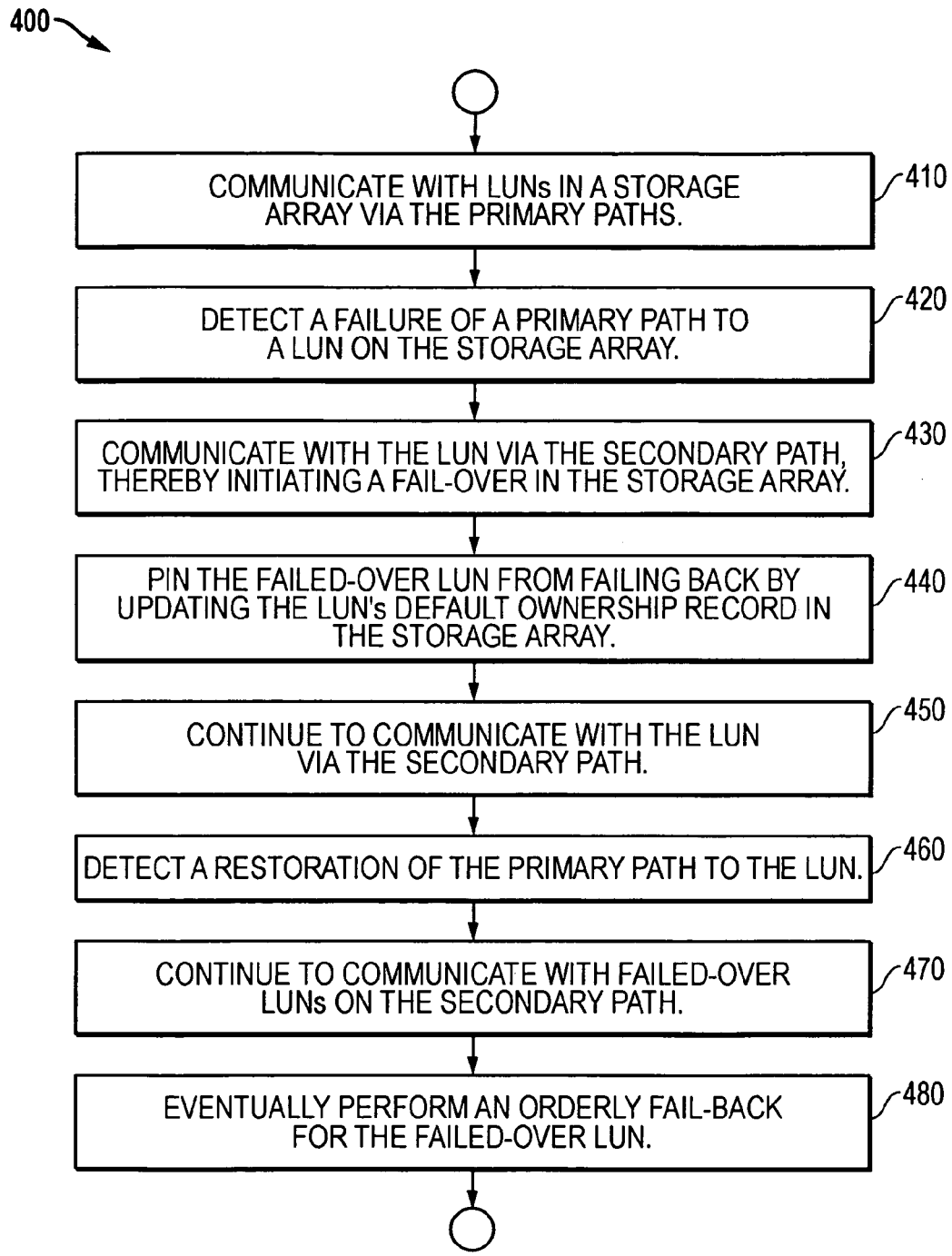
FIG. 4 is a flow chart illustrating one implementation of techniques for avoiding mismatches between path assignments in a host processor and in a storage array.

FIG. 4 is a flow chart illustrating one implementation 400 of a procedure for avoiding mismatches between path assignments in a host processor and in an ALUA array or other storage array. This procedure may control the ALUA array's designations of the default path and the current path to pin down the LUNs that have failed over. By pinning down the failed-over LUNs, this procedure may prevent undesired fail-backs.

The procedure 400 may be carried out in whole or in part by the DMP software of a processing host. Alternatively, the procedure 400 may be performed by one or more other modules. The procedure may track the group membership of LUNs in an ALUA array, and modify the group membership as needed to prevent undesired fail-backs and fail-overs. The tracking and modifying may be performed through array commands that are generally available on storage arrays for obtaining and setting the default and current ownership records of each LUN.

In act 410 of procedure 400, a host processor communicates with the LUNs in a storage array with auto-trespass features, such as an ALUA array. The communication is performed via the primary paths for the LUNs. During the course of operations, the primary path (or primary paths, if more than one is present) to one of the LUNs may fail. The host processor detects this failure in act 420, and switches to using the secondary path (or one of the secondary paths, if more than one is present). This communication triggers a fail-over in the storage array, so that the storage array also uses the secondary path for the LUN. In act 440, the host processor pins the failed-over LUN, so that the storage array is inhibited from performing an automatic fail-back of the failed-over LUN. The pinning may lock an appropriate record in the storage array to designate the secondary path for regular use by the failed-over LUN (e.g., by designating a secondary controller on the storage array as the default owner for the LUN). The pinning may be performed by sending appropriate interface commands (such as SCSI or Fibre Channel commands) to the storage array to ungroup the failed-over LUN from any existing LUN grouping. Similarly, the pinning may be performed by sending appropriate interface commands for changing the designation of the primary path for the LUN, so that the storage array considers the former secondary path as the new primary path for the LUN. In act 450, the host processor then continues to communicate with the LUN via the secondary path while the primary path is unavailable.

In act 460, the host processor detects a restoration of the primary path to the LUN. The host processor may then use the restored path for communicating with various LUNs. For example, if the host processor needs to communicate with a formerly idle LUN for which the restored path is a primary path, the host processor may use the restored path for communicating with that formerly idle LUN. This approach may avoid an unnecessary fail-over of the formerly idle LUN.

The host processor may also use the restored path for communicating with the failed over LUNs. However, as indicated in act 470, the host processor may continue to communicate with failed-over LUNs on the secondary path, thereby avoiding an immediate fail-back (and any associated minor disruptions) for those LUNs. In act 480, the host processor may eventually perform an orderly fail-back for the failed-over LUN. The fail-back may be performed to restore the benefits of rough load-balancing that the storage array may have been arranged in its initial assignment of LUN groups. The fail back in act 480 may include a reversal of interface commands carried out in act 440.

Figure 5:
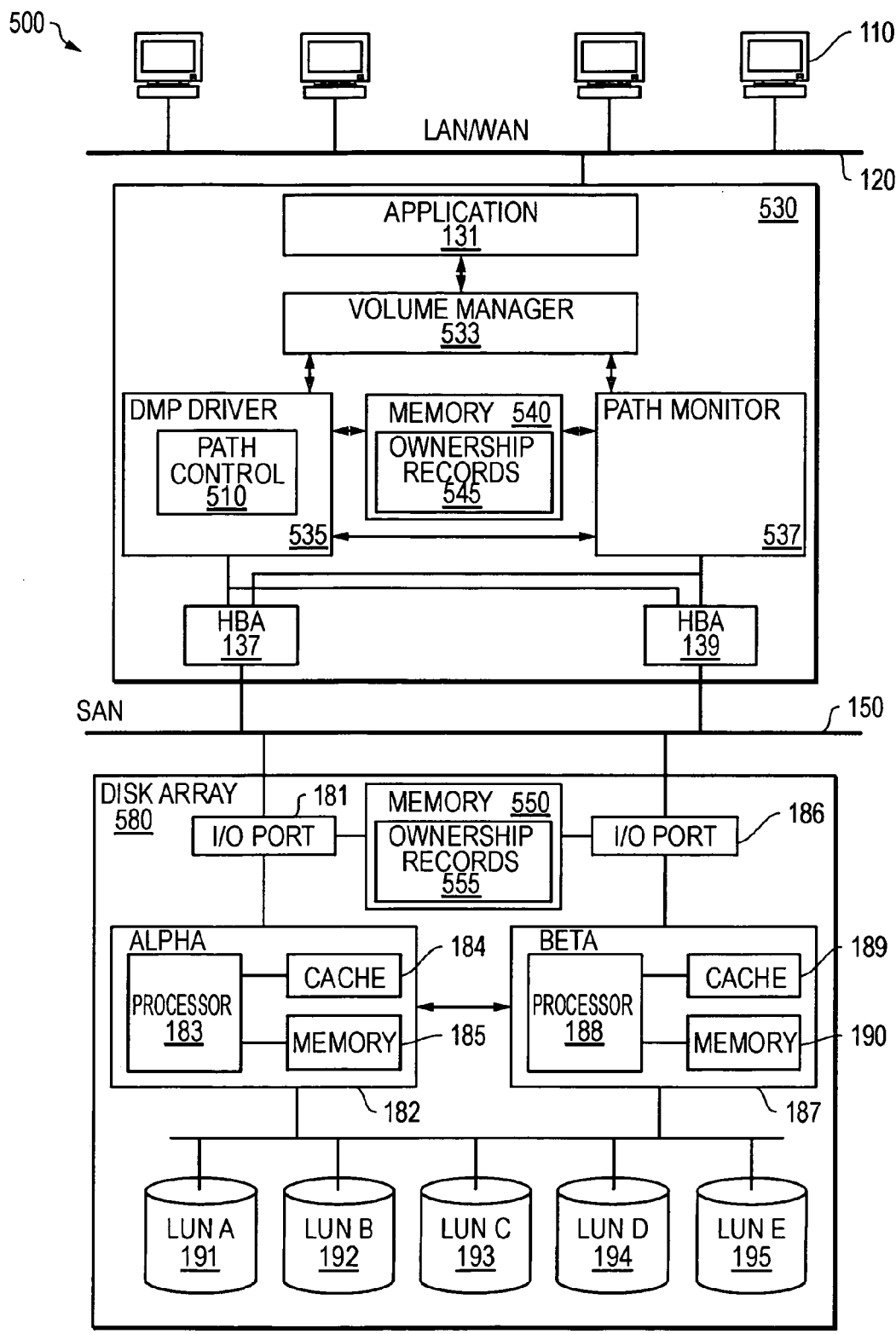
FIG. 5 is a simplified block diagram illustrating components of one implementation of a computing system that avoids mismatches between path assignments in a host processor and in a storage array.

FIG. 5 is a simplified block diagram illustrating components of one implementation 500 of a computing system configured to avoid mismatches between path assignments in a host processor and in a storage array. The computing system includes a host 530 and a disk array 580. The host 530 includes a DMP driver 535, a path monitor 537, a volume manager 533, and a memory 540. The DMP driver 535 may include a path control module 510. The memory 540 may be used to store ownership records 545. The storage array 580 may also include a memory 550 that may be used to store ownership records 555.

Other system components illustrated in FIG. 5 may function in a manner similar to corresponding components shown in FIG. 2. For example, host 530 may exchange data over a network 120 such as a LAN or WAN. Network 120 may provide a communication path for various client computer systems 110 to communicate with host 530. SAN 150 may provide communications between host 530 and storage array 580. The host processor may execute application programs 131 and may include host bus adaptors (HBAs) 137 and 139. The DMP driver 535 and the path monitor 537 may be coupled to each other, to memory 540, to volume manager 533, and to host bus adapters 137 and 139. The storage array 580 may include I/O ports 181 and 186, storage controllers 182 and 187, and LUNs 191-195. The memory 550 may be coupled to the I/O ports 181 and 186 and to the storage controllers 182 and 187.

In the storage array, memory 550 may be used to store information regarding the primary and secondary paths associated with each of various LUNs in the storage array. This information may include ownership records 555 indicating which of various controllers are to be used currently for various LUNs. The ownership records 555 in the storage array 580 may also include indications of which controllers are to be used as defaults for various LUNs.

In the host processor, path monitor 537 in may be configured to detect failures and restorations of data paths that couple the host 530 to the LUNs 191-195. The path monitor may also be configured to trigger alerts and warnings in response to path failures. Memory 540 in the host processor may be used by the host 530 to store information regarding the primary and secondary paths associated with each of various LUNs with which the host processor communicates. This information may include ownership records 545 indicating which of various controllers are to be used for communicating with various LUNs. The ownership records 545 in the host 530 may also include indications of default controllers for various LUNs.

The path control module 510 may be used by the host processor to select which of various data paths are to be used by the host processor for communicating with various LUNs. The path control module may also issue commands to storage arrays to modify path designations in the storage arrays. For example, the path control module may be configured to generate and transmit SCSI or Fibre Channel commands to storage array 580, so that the storage array can modify ownership records 555. The path control module may operate under the DMP driver 535 to harmonize the ownership records 555 in the storage array with the ownership records 545 in the host processor.

More specifically, the path control module may issue appropriate commands to the storage array so that the ownership records 555 are updated in view of existing fail-overs to avoid unnecessary trespasses on data paths in the storage array. For example, the DMP driver 535 and the path control module 510 may execute procedures such as the procedure 400 to avoid undesirable trespasses.

Although the DMP driver 535 and various other features have been described in the context of a standard host computer system, it should be noted that these features and functionality may be implemented in a variety of other architectures such as clustered computing systems and specialized storage devices (e.g., SAN switches, SAN routers, SAN hubs, or some type of storage appliance). Moreover, the present systems, methods, devices, and software may be implemented in conjunction with a variety of different virtualization schemes (e.g., host based, appliance based, storage based, in-band, out-of-band, etc.) and indeed with no virtualization scheme at all. Similarly, a variety of different storage devices, and indeed addressable storage objects generally, may be used in conjunction with the methods, devices, and software disclosed.

Figure 6:
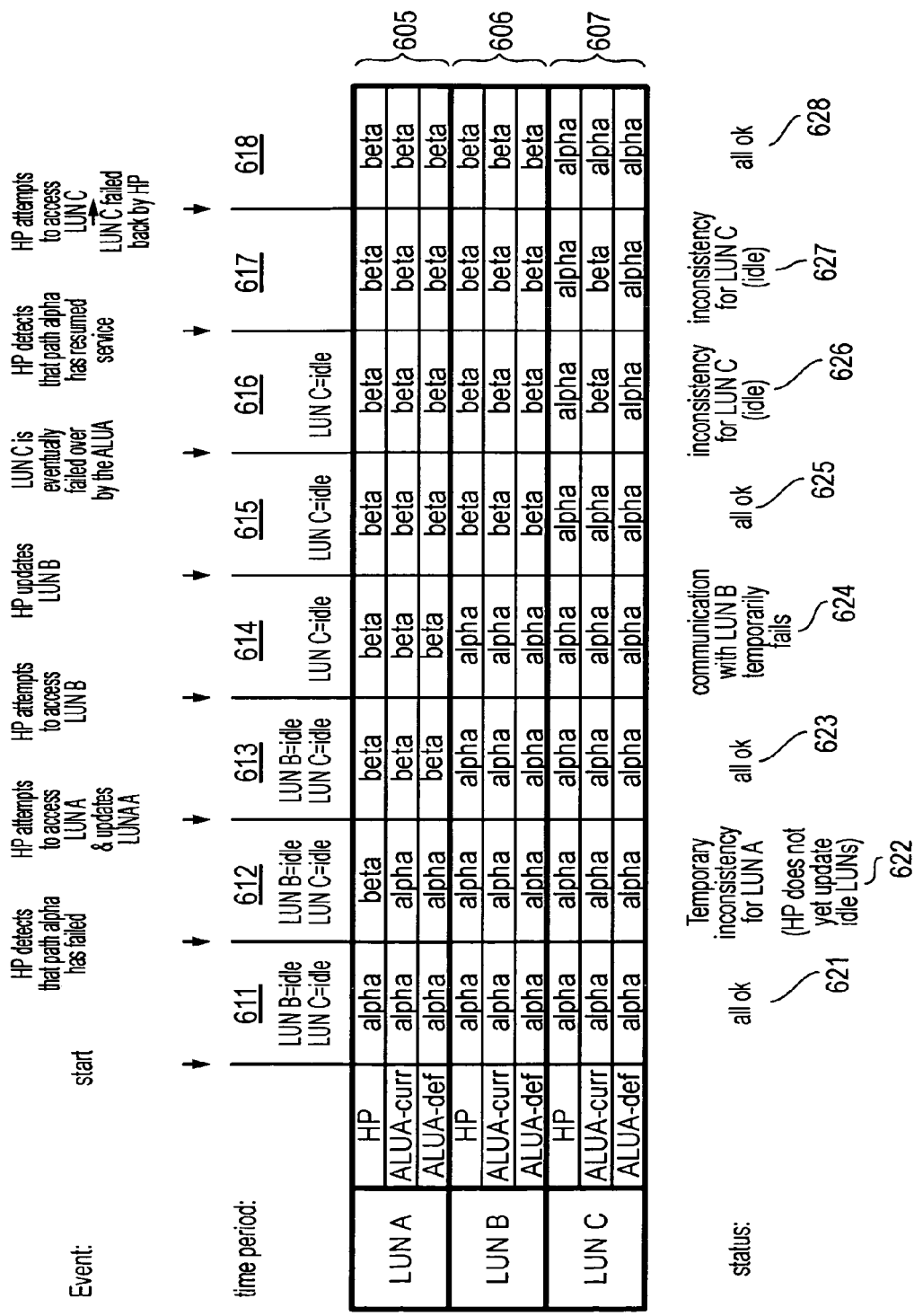
FIG. 6 is a timing diagram illustrating an example of a procedure for preventing mismatch in path assignments in a host processor and in a storage array.

FIG. 6 is a timing diagram illustrating an example of a procedure for preventing mismatch in path assignments in a host processor and in a storage array. FIG. 6 illustrates an analysis of performance of an ALUA array, such as storage array 580, operating with a host processor, such as host 530, to execute the procedure.

Similar to the analysis from FIG. 3, in the timing diagram of FIG. 6 the ALUA array has made various groupings of LUNs. One of the groups has three of the LUNs, indicated in the timing diagram as LUN A, LUN B, and LUN C (such as LUNs 191, 192, and 193, respectively from FIG. 5). The timing diagram includes three rows 605, 606, and 607 for the three LUNs A, B, and C, respectively. The timing diagram includes eight columns 611-618 for eight sequential time periods depicted in the figure. Below each column is a status 621-628 describing the system for the corresponding time period.

The timing diagram of FIG. 6 includes three entries for each LUN at each time period. These three entries indicate which one of two paths, designated as "alpha" and "beta," has been designated for use in communicating with a particular LUN at a particular time. The alpha and beta paths may be, for example, the data paths that use controllers 182 and 187, respectively from FIG. 5. One of the three entries shows (a) whether the host processor ("HP") designates path alpha or path beta for access to the LUN. The remaining two entries show (b) whether the ALUA array designates path alpha or path beta for current access to the LUN ("ALUA-curr"), and (c) whether the ALUA array designates path alpha or path beta for default access to the LUN ("ALUA-def").

The timing diagram of FIG. 6 begins with column 611, in which all records indicate path alpha as the path to be used for communication with LUNs A, B, and C. The ALUA array has designated LUNs A, B, and C to be in one group, and has designated path alpha as the primary path for the LUNs in this group. Thus, the ALUA array's records show that the default path for each LUN in this group is path alpha, and the current path for these LUNs has been initially set to be path alpha. The host processor has learned of these assignments by querying the ALUA array, and has set its records to show that path alpha is the path to be used for all three LUNs in the group. With LUNs B and C idle, the host processor communicates with LUN A. Status 621 indicates this situation is a satisfactory state for the ALUA array and the host processor.

This initial condition in column 611 is similar to the situation depicted in column 311 from FIG. 3. However, the response of the system is different from that in FIG. 3, as can be seen from the following discussion.

In this example, the host processor then detects that path alpha has failed. The multi-pathing software on the host processor (such as DMP driver 535 from FIG. 5) may respond by switching to using path beta for subsequent I/O operations to LUNs that were assigned to the failed path. These changes in path designation for the host processor may be performed, for example, by path control module 510 acting on ownership records 545. Meanwhile, the ALUA array has not yet learned of the failure of path alpha, and continues to indicate that path alpha is to be used for LUNs A, B, and C in column 612.

Unlike the example from FIG. 3, the host processor may avoid changing its designation of paths for idle LUNs. Thus, as illustrated in column 613, the host processor changes its designated path for LUN A to path beta. However, the host processor defers from changing its path designations for LUNs B and C. As illustrated in rows 606 and 607 of column 612, LUNs B and C remain assigned to path alpha, in the records of the host processor as well as in the records of the ALUA array.

The result of the host processor making an internal change is summarized in status 622. The change brings about an inconsistency between the host processor and the ALUA array regarding the path assignment of LUN A. This inconsistency, however, does not substantially affect system performance, since no communication is occurring with LUNs A during time period 612.

When the host processor then communicates with LUN A on path beta, this communication is seen by the ALUA array as a trespass on path beta. The ALUA array may then fail over LUN A to path beta in response to the resulting trespass, as illustrated in column 613.

Additionally, and unlike the example from FIG. 3, the host processor may issue appropriate commands to the ALUA array to update the ALUA array's default designation for the failed-over LUN. As a result, column 614 shows that the default designation in the ALUA array for LUN A is updated to path beta. In various implementations of the ALUA array, this update may be performed by dissociating LUN A from other members of the group. Similarly, this update may be performed by changing the ALUA array's designated primary path for LUN A. The resulting status 623 is consistent records for each of the LUNs.

The host processor initiates communication with LUN B between time periods 613 and 614. In column 614, no change occurs in the records for LUNs A and C. Regarding LUN B, the host processor attempts to communicate with LUN B over the failed path alpha. The result 624 is a temporary failure to communicate with LUN B.

Eventually, the host processor may initiate the fail-over for LUN B by (1) updating the host processor's designation of the path to use for LUN B, (2) updating the ALUA array's designation of the default path for LUN B, and (3) communicating with LUN B on the backup path beta. The ALUA may then detect the communication as a trespass on path beta and respond by updating the designation of current path to be path beta. (Alternatively, the host processor may issue appropriate commands to the ALUA array to update the current path to be path beta.) The resulting situation is illustrated in column 615, in which the records for LUN B have been updated to indicate path beta. The resulting status 625 is consistent records for each of the LUNs.

The fail-over for LUN C may eventually be performed by the ALUA array. The resulting situation is illustrated in column 616. This column has the same entries as column 615, except that the ALUA array designates path beta as the current path to be used for LUN C. Status 626 reflects a resulting inconsistency between the assignments in the ALUA array and the host processor for LUN C. This inconsistency does not degrade performance, since LUN C is idle.

Column 617 illustrates the situation after the host processor discovers the restoration of path alpha. The host processor may not immediately fail back its designations for all of the LUNs. For example, since communication is occurring successfully with LUNs A and B, the host processor may wait before switching back to path alpha for these LUNs. Thus, the status for LUNs A and B is the same in column 617 as in column 616. Regarding idle LUN C, the host processor needs to make no internal changes, since it previously deferred from updating the records for idle LUNs (in column 612). The inconsistency from status 626 regarding LUN C therefore persists in status 627, but may not pose a significant problem since LUN C is idle.

If the host processor then initiates communication with LUN C, the host processor may attempt to reach LUN C through path alpha. The ALUA array, however, may expect communication on the path beta, since path beta is designated as the current path (as shown in row 607, column 617). The ALUA array may detect this communication as a trespass on path alpha, since path alpha is not the current path for LUN C. Further, since path alpha is the default path for LUN C, the ALUA array may respond by performing a fail-back for LUN C. This fail-back again designates path alpha as the current path for LUN C.

The result of the fail-back is shown in column 618. LUN C has been failed back by the ALUA array has failed back LUN C so that the current path is path alpha—the same as the default path. The ALUA array has not performed a group fail-back for LUNs A and B along with LUN C, because path alpha is no longer the default path for LUNs A and B. The records between the storage array and the host processor are now consistent for each of LUNs A, B, and C, as indicated in status 628. This status may be achieved, as in the illustrated example, without substantial degradation of the performance of the ALUA array.

Eventually, the host processor may reset the various designations for LUNs A and B to the restored path alpha, in order to recover any rough load balancing that the ALUA had sought by making the initial group assignments.

Figure 7:
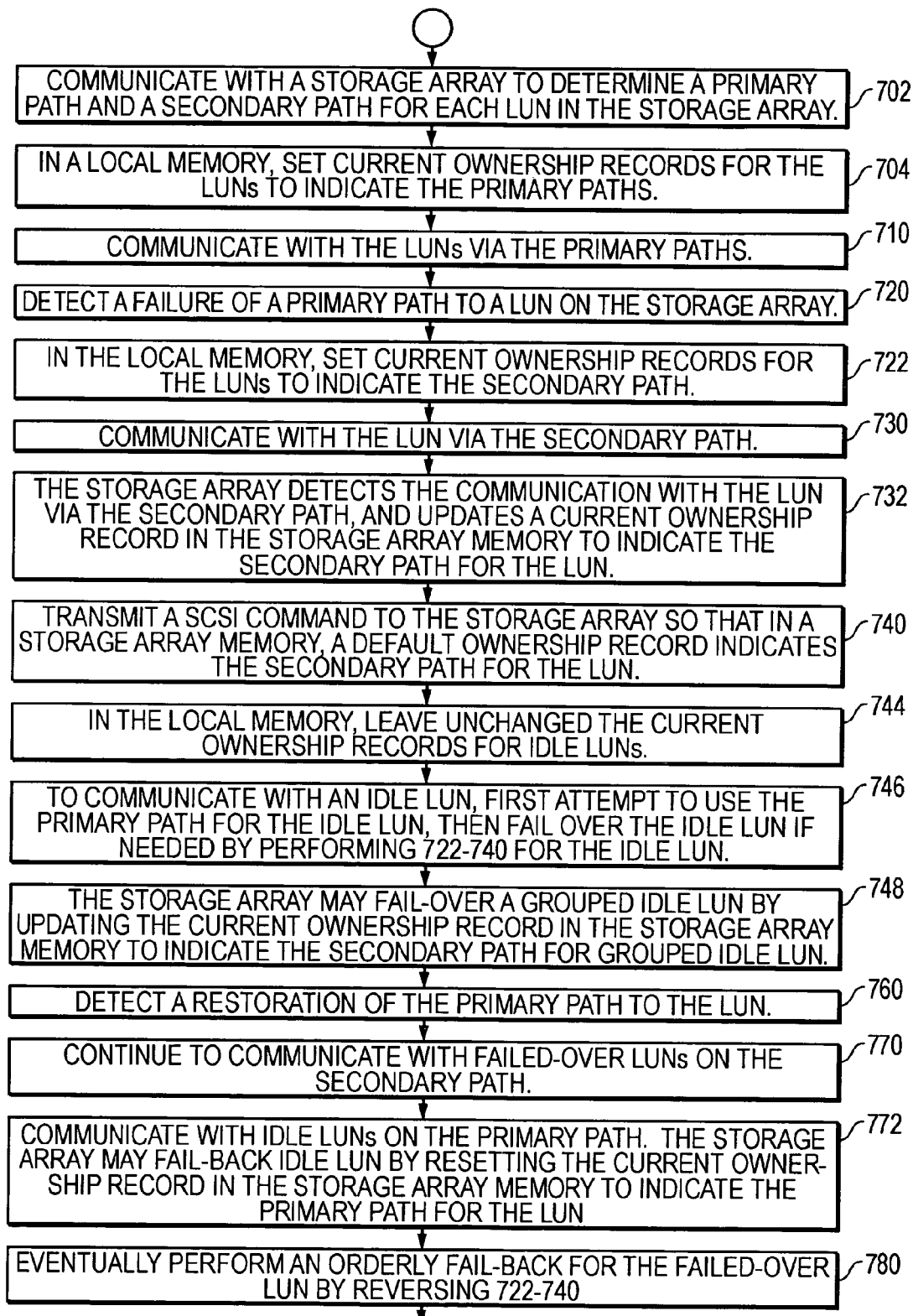
FIG. 7 is a flow chart illustrating a second implementation of techniques for avoiding mismatches between path assignments in a host processor and in a storage array.

FIG. 7 is a flow chart illustrating a second implementation 700 of techniques for avoiding mismatches between path assignments in a host processor and in a storage array. This procedure 700 may prevent undesired fail-backs in the storage array. The procedure 700 controls the ALUA array's designations of the default path and the current path to pin down the LUNs that have failed over.

The procedure 700 may be carried out in whole or in part by the DMP software of a processing host, such as DMP driver 535 and path control block 510 from FIG. 5. Alternatively, the procedure 700 may be performed by one or more other modules in a host processor, and may use external devices and modules, such as components in a storage array.

The procedure 700 may commence in act 702 by communicating with a storage array to determine a primary path and a secondary path for each LUN in a storage array with auto-trespass features, such as an ALUA array. The primary and secondary paths may be selected by the storage array in a preliminary attempt at load-balancing various paths into the storage array. In act 704, the processing host uses a local memory to set current ownership records for LUNs with which the processing host may communicate. The current ownership records in the processing host memory may indicate the primary paths for the LUNs. The processing host may then communicate with the LUNs on their respective primary paths in act 710. During the course of communication, the host processor, or the storage array, or both, may identify one or more of the LUNs as idle LUNs. The idle LUNs may be considered LUNs with which communication has temporarily paused, and which may not require immediate path updating in the event of a path failure.

This communication in act 710 may proceed until a path failure occurs for one of the paths being used for communication with the LUNs. The host processor detects this failure in act 720, and switches to using the secondary path (or one of the secondary paths, if more than one is present) for the affected LUNs.

The switching may include various actions in response to the path failure. In act 722 the host processor may reset the current ownership records in the processing host memory to indicate that the primary path is replaced by the secondary path for the affected LUNs. This communication may trigger a fail-over in the storage array in act 732 so that the storage array also uses the secondary path for the LUN. In act 740, the host processor may pin the failed-over LUN so that the storage array is inhibited from performing an automatic fail-back of the LUN. The pinning may be performed by sending appropriate interface commands (such as SCSI or Fibre Channel commands) to the storage array to ungroup the failed-over LUN from any existing LUN grouping. Similarly, the pinning may be performed by changing the designation of the primary path for the LUN, so that the storage array considers the former secondary path as the new primary path for the LUN. Further, the pinning may include updating a default owner record in the storage array to indicate that a back-up controller in the storage array has become the default controller in the storage array for the LUN.

By changing the storage array's designations of primary or default paths for the failed-over non-idle LUNs, the host processor may ensure some consistency between the records of the storage array and the records of the host processor. Further, such changes may pin the failed-over LUNs to avoid an unexpected fail-back of grouped LUNs once the failed path is restored.

Regarding idle LUNs, the host processor may avoid immediately updating records relating to idle LUNs, as indicated in act 744. If the host processor eventually needs to communicate with an idle LUN, the host processor may first attempt to use the primary path for the idle LUN, as noted in act 746. If the primary path remains unavailable for the idle LUN, the host processor may switch to a secondary path for the idle LUN by performing acts 722-740 for the idle LUN.

By deferring updates of the path assignments for idle LUNs, the host processor may prevent unwanted subsequent fail-overs of idle LUNs after the failed path is restored. A cost of this measure may be a temporary communication failure, such as discussed above with reference to FIG. 6 for LUN B (column 614, row 606).

The storage array may independently update the assigned data paths for idle LUNs. As indicated in act 748, the storage array may fail over a grouped idle LUN by updating the current ownership record in the storage array memory to indicate the secondary path for one or more grouped idle LUNs.

The host processor may then continue to communicate with the non-idle LUNs (and with any formerly idle LUNs that resume activity in act 746) via the secondary path while the primary path is unavailable.

In act 760, the host processor detects a restoration of the primary path to the LUN. The host processor may then use the restored path for communicating with various LUNs. However, the host processor may delay fail-back procedures for one or more LUNs.

For example, the host processor may continue to communicate with failed-over LUNs on the secondary path, as noted in act 770, and may communicate with any idle LUNs that subsequently resume activity on the primary path. In response to receiving communication on the primary path for a formerly idle LUN, the storage array may fail back the idle LUN in act 772. The fail-back on the storage array may include the storage array resetting the current ownership record in the storage array memory to be the same as the default ownership record for the LUN.

In act 780, the host processor may eventually perform an orderly fail-back for the failed-over LUN by reversing acts 722-740. This reversal may include transmitting appropriate interface commands to the storage array, to appropriately reset the ownership records in the storage array.

Figure 8:
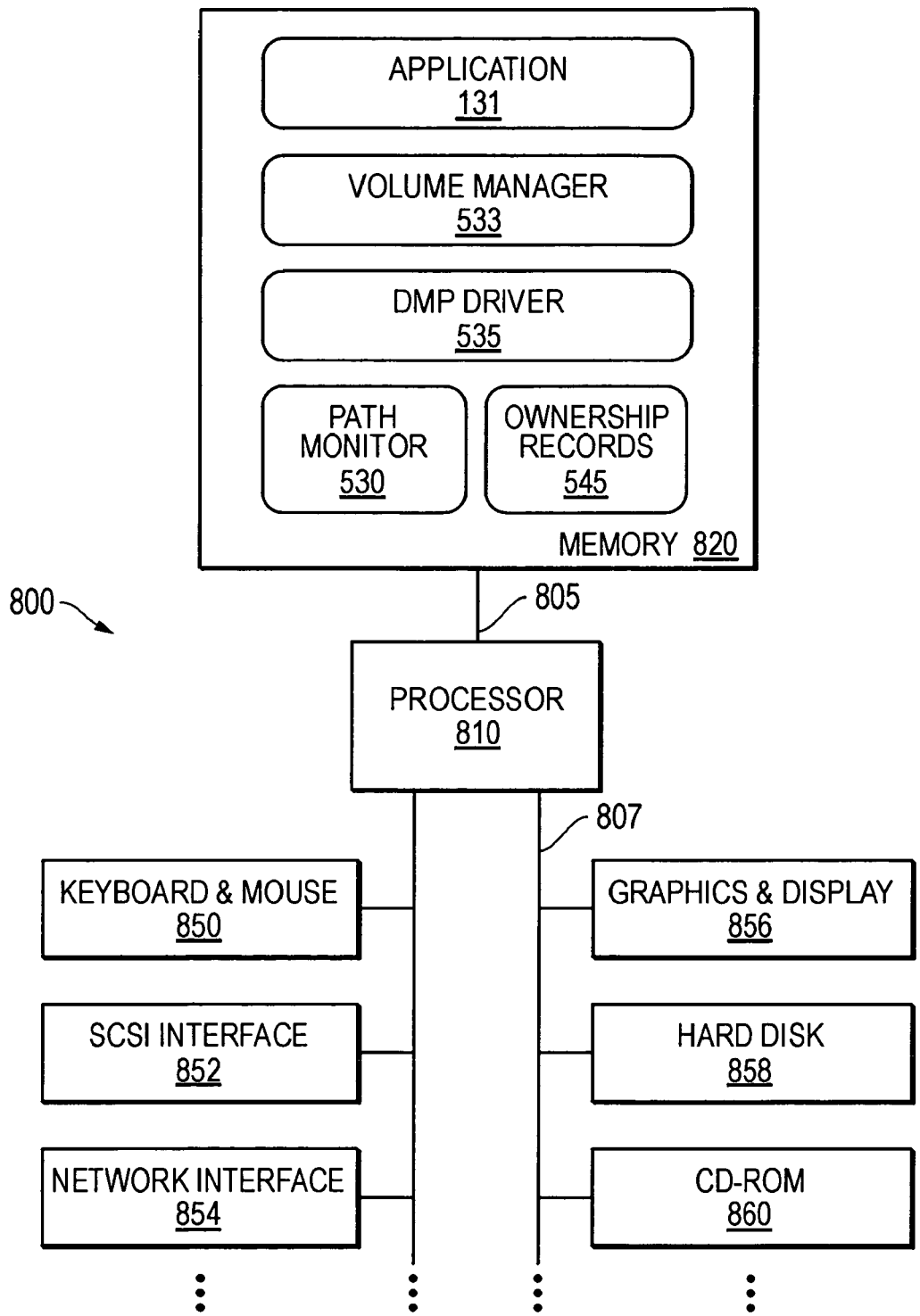
FIG. 8 is a block diagram of one embodiment of a computer system for implementing the techniques of the present invention.

FIG. 8 is a block diagram of one embodiment of a computer system for implementing the techniques of the present invention. FIG. 8 illustrates a block diagram of a computer system 800 configured to implement the techniques described herein. For example, computer system 800 may be an embodiment of one of the previously described host processors. Computer system 800 may include a processor 810 and a memory 820 coupled together by a communications bus 805. Processor 810 may be a single processor or a number of individual processors working together. Memory 820 is typically random access memory (RAM), or some other dynamic storage device, and is capable of storing instructions to be executed by the processor, e.g., application 131, volume manager 533, DMP driver 535, path monitor 537, and ownership records 545. Memory 820 may also be used for storing temporary variables or other intermediate information during the execution of instructions by the processor 810.

Computer system 800 may also includes devices such as a keyboard & mouse 850, a SCSI interface 852, a network interface 854, a graphics & display 856, a hard disk 858, and a CD-ROM 860, all of which are coupled to processor 810 by communications bus 807. It will be apparent to those having ordinary skill in the art that computer system 800 may also include numerous elements not shown in the figure, such as additional storage devices, communications devices, input devices, and output devices, as illustrated by the ellipsis shown. An example of such an additional computer system device is a Fibre Channel interface.

The flow charts of FIGS. 4 and 7 illustrate some of the many operational examples of the techniques disclosed in the present application. Those having ordinary skill in the art will readily recognize that certain steps or operations illustrated in FIGS. 4 and 7 may be eliminated or taken in an alternate order. Moreover, the methods described in FIGS. 4 and 7 and many of the modules illustrated in FIG. 5 are typically implemented as one or more software programs for a computer system and are encoded in a computer readable medium as instructions executable on one or more processors. The computer readable medium may be any one of an electronic storage medium, a magnetic storage medium, an optical storage medium, and a communications medium conveying signals encoding the instructions. Separate instances of these programs may be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized in a variety of different storage devices and computing systems with variations in, for example, the number of nodes, the type of operation of the computing system, e.g., various forms of automated trespass responses, the number and type of shared data resources, and the number of paths between nodes and shared data resources.

Those having ordinary skill in the art will readily recognize that the techniques and methods discussed below may be implemented in software using a variety of computer languages, including, for example, traditional computer languages such as assembly language, Pascal, and C; object oriented languages such as C++, C#, and Java; and scripting languages such as Perl and Tcl/Tk. Additionally, software 510, 533, 535, and 537 may be provided to the computer system via a variety of computer readable media including electronic media (e.g., flash memory), magnetic storage media (e.g., hard disk 858, a floppy disk, etc.), optical storage media (e.g., CD-ROM 860), and communications media conveying signals encoding the instructions (e.g., via a network coupled to network interface 854).

The present invention has been, in some cases, described in terms of providing support for ALUA storage arrays. It will be appreciated, however, that present invention may also be used to support other forms of storage arrays with auto-trespass features.

Although the present invention has been described in connection with several embodiments, the invention is not intended to be limited to the specific forms set forth herein. On the contrary, it is intended to cover such alternatives, modifications, and equivalents as may be reasonably included within the scope of the invention as defined by the appended claims.

What is claimed is:

1. A method comprising:
   detecting a failure of a first data path to a logical unit (LUN) on a storage array with trespass-based failover, where:
   the first data path includes a first controller on the storage array; and in response to the detecting the failure,
   locking a record in the storage array to designate a second controller on the storage array for communication with the LUN, where:
   the locking prevents the storage array from resetting the record in the storage array to designate the first controller for communication with the LUN, and
   communicating with the LUN through a second data path that includes the second controller on the storage array.

2. The method of claim 1, further comprising setting a current record in the storage array to designate the second controller for communication with the LUN.

3. The method of claim 1, where the locking comprises setting a default record in the storage array to designate the second controller for communication with the LUN.

4. The method of claim 1, where the locking comprises setting a default record in the storage array to designate the second controller for communication with the LUN, the method further comprising:
   setting a current record in the storage array to designate the second controller for communication with the LUN.

5. The method of claim 1, where the locking comprises updating a group membership of the LUN to associate the LUN with the second controller.

6. The method of claim 1, where the locking comprises updating a group membership of the LUN to associate the LUN with the second controller, the method further comprising:
  setting a current record in the storage array to designate the second controller for communication with the LUN.

7. The method of claim 1, where communicating with the LUN through the second data path induces a trespass-based fail-over in the storage array.

8. The method of claim 1, where communicating with the LUN through the second data path induces a trespass-based fail-over in the storage array and sets a current record in the storage array to designate the second controller for communication with the LUN.

9. The method of claim 1, further comprising:
  in response to the detecting the failure,
    a host processor deferring an update in the host processor of a record designating a controller on the storage array for communication with an idle LUN associated with the failed first data path.

10. The method of claim 1, further comprising:
  in response to the detecting the failure,
    a host processor maintaining a record in the host processor as designating the first controller for communication with an idle LUN associated with the failed first data path;
  in response to an instruction to communicate with the idle LUN,
    the host processor attempting to communicate with the idle LUN through the first data path, and
    the host processor communicating with the idle LUN through the second data path if the first data path remains unavailable.

11. A system comprising:
  a memory comprising ownership records designating a controller on a storage array with trespass-based failover;
  a dynamic multipath module configured to communicate with a logical unit (LUN) on the storage array through the controller designated in the memory; and
  a path monitor module configured to detect a failure of a first data path to the LUN;
  where:
    the first data path includes the controller designated in the memory; and
    in response to the path monitor module detecting a failure of the first data path to the LUN, the dynamic multipath module is further configured to:
      update the ownership records in the memory to designate an alternate controller on the storage array to be used for communication with the LUN, and
      update a record in the storage array to designate the alternate controller as a default owner for the LUN.

12. The system of claim 11, where:
  the ownership records in the memory designate a primary controller and a secondary controller on the storage array;
  the dynamic multipath module is further configured to communicate with the LUN initially through the primary controller, and through the secondary controller in response to the path monitor module detecting a failure of a data path using the primary controller.

13. The system of claim 12, where the dynamic multipath module is further configured to update the record in the storage array to designate the secondary controller as the default owner for the LUN.

14. The system of claim 11, where in response to the path monitor module detecting a failure of the first data path to the LUN, the dynamic multipath module is further configured to:
  maintain the ownership records in the memory for an idle LUN on the storage array;
  attempt to communicate with the idle LUN through the first data path in response to an instruction to communicate with the idle LUN; and
  update the ownership records in the memory to designate the alternate controller if the attempt fails.

15. The system of claim 11, where in response to the path monitor module detecting the failure of the first data path to the LUN, the dynamic multipath module is further configured to communicate with the LUN through the second data path, thereby inducing a trespass-based fail-over in the storage array.

16. A computer readable medium comprising program instructions executable on a processor, the computer readable medium being at least one of an electronic storage medium, a magnetic storage medium, an optical storage medium, and a communications medium conveying signals encoding the instructions, where the program instructions are operable to implement each of:
  detecting a failure of a first data path to a logical unit (LUN) on a storage array with trespass-based failover, where:
    the first data path includes a first controller on the storage array; and
  in response to the detecting the failure,
    locking a record in the storage array to designate a second controller on the storage array for communication with the LUN, where:
      the locking prevents the storage array from resetting the record in the storage array to designate the first controller for communication with the LUN, and
    communicating with the LUN through a second data path that includes the second controller on the storage array.

17. The computer readable medium of claim 16, where communicating with the LUN through the second data path induces a trespass-based fail-over in the storage array and sets a current record in the storage array to designate the second controller for communication with the LUN.

18. The computer readable medium of claim 16, where the program instructions are further operable to implement each of:
  in response to the detecting the failure,
    a host processor maintaining a record in the host processor as designating the first controller for communication with an idle LUN associated with the failed first data path;
  in response to an instruction to communicate with the idle LUN,
    the host processor attempting to communicate with the idle LUN through the first data path, and
    the host processor communicating with the idle LUN through the second data path if the first data path remains unavailable.

19. An apparatus comprising:
  a memory comprising ownership records, where the ownership records designate a controller on a storage array;

a first means for communicating with a logical unit (LUN) on the storage array through the controller designated in the memory; and a second means for detecting a failure of a first data path to the LUN;

where:

the first data path includes the controller designated in the memory; and in response to the second means detecting a failure of the first data path to the LUN, the first means is configured to:

update the ownership records in the memory to designate an alternate controller on the storage array to be used for communication with the LUN, initiate a trespass-initiated failover on the storage array for the LUN by communicating with the LUN through the alternate controller, and update a record in the storage array to designate the alternate controller as a default owner for the LUN.

20. The system of claim 19, where:

the ownership records in the memory designate a primary controller and a secondary controller on the storage array;

the ownership records initially designate the primary controller as the default owner for the LUN;

first means is further configured to update the record in the storage array to designate the secondary controller as the default owner for the LUN in response to the failure of the first data; and the first means is further configured to communicate with the LUN through the default owner for the LUN.

21. The system of claim 19, where in response to the second means detecting a failure of the first data path to the LUN, the first means is further configured to:

maintain the ownership records in the memory for an idle LUN on the storage array;

attempt to communicate with the idle LUN through the first data path in response to an instruction to communicate with the idle LUN; and update the ownership records in the memory to designate the alternate controller if the attempt fails.

22. The system of claim 19, where in response to the second means detecting the failure of the first data path to the LUN, the first means is further configured to communicate with the LUN through the alternate controller, thereby inducing a trespass-based fail-over in the storage array.

* * * * *